United States Patent [19]
Clarke et al.

[11] 4,364,756
[45] Dec. 21, 1982

[54] REFRIGERANT SUCTION LINE FILTER/FILTER-DRIER AND METHOD FOR THE CONSTRUCTION THEREOF

[75] Inventors: John P. Clarke; Ernest W. Schumacher, both of DeSoto, Tex.

[73] Assignee: Virginia Chemicals Inc., Portsmouth, Va.

[21] Appl. No.: 281,213

[22] Filed: Jul. 7, 1981

[51] Int. Cl.³ .................. B01D 50/00; B01D 25/02; B01D 27/02; F25B 47/00
[52] U.S. Cl. .................. 55/316; 55/323; 55/331; 55/337; 55/457; 55/485; 55/502; 55/509; 55/DIG. 17; 55/DIG. 5; 210/282; 210/304; 210/450; 210/456; 210/DIG. 6; 62/85
[58] Field of Search .................. 55/97, 307, 308, 316, 55/321–323, 327, 329, 331, 337, 457, 485, 488, 489, 502, 509, DIG. 17, DIG. 25, DIG. 5; 210/266, 282, 304, 309, 335, 450, 456, DIG. 6; 29/163.5 F; 62/85, 476, 480

[56] References Cited

U.S. PATENT DOCUMENTS

| | | | |
|---|---|---|---|
| 2,225,990 | 12/1940 | Henry | 55/509 |
| 2,843,341 | 7/1958 | Dannenberg et al. | 55/485 |
| 2,873,856 | 2/1959 | Jones | 210/266 |
| 3,175,342 | 3/1965 | Balogh | 55/316 |
| 3,434,599 | 3/1969 | Wischmeyer et al. | 55/316 |
| 3,464,186 | 9/1969 | Hankison et al. | 55/316 |
| 3,721,069 | 3/1973 | Walker | 55/337 |
| 3,796,025 | 3/1974 | Kasten | 55/DIG. 17 |
| 4,209,401 | 6/1980 | Henton | 210/266 |
| 4,303,426 | 12/1981 | Battis | 55/502 |

FOREIGN PATENT DOCUMENTS 944604  5/1956  Fed. Rep. of Germany ........ 55/509

*Primary Examiner*—David L. Lacey
*Attorney, Agent, or Firm*—Depaoli & O'Brien

[57] ABSTRACT

A combined filter and filter-drier, for the suction side of refrigeration and air conditioning systems, comprises a dual filter system straddling a cylindrical plug of dessicant. Upstream of the dessicant, a rigidly built primary filter assembly comprises an inlet deflector and a stepped filter. Downstream of the dessicant, a secondary filter assembly comprises an outlet filter pad which is compressed by a coaxially disposed spring near the inlet of the filter/filter-drier. The inlet deflector is preferably triangular in shape and is disposed transversely to the inlet. The stepped filter comprises a deflector filter pad, which preferably has the same shape but a smaller size than the inlet deflector, and a filter pad which is round, preferably is twice as thick as the deflector filter pad, and has a smaller diameter than the inside diameter of the filter/filter-drier, whereby an annular space is provided for swirling flow of an incoming vaporous mixture which thereby enters the peripheries of the stepped filter. In consequence, particles are gradually deposited throughout the interiors of the deflector filter pad and inlet filter pad so that pressure build up across the filter/filter-drier is also gradual and provides a warning of impending need for replacement. A method for constructing the filter-drier is also disclosed.

17 Claims, 15 Drawing Figures

REFRIGERANT SUCTION LINE FILTER/FILTER-DRIER AND METHOD FOR THE CONSTRUCTION THEREOF

BACKGROUND OF THE INVENTION

1. Field of the Invention

The invention relates to filter-driers which are used in the suction line, between the evaporator and the compressor in a refrigeration or air conditioning system, for filtering and dehydrating the refrigerant and oil in their vapor states.

2. Review of the Prior Art

In air conditioning, refrigerating, heat pump, and hot gas defrost systems of the prior art, filters and driers are essential components for removing harmful contaminants and protecting the motor compressor, the heart of any such system, which is called upon today to withstand increasingly severe operational conditions because market conditions are requiring smaller and more compact systems and higher speed compressors which subject the unit to higher temperatures and pressures and tend to shorten its life and increase the danger of premature breakdown.

Because the electrical portion of the motor is in direct contact with the refrigeration circuit, the chemical environment to which it is exposed is of prime importance. In addition, it is subject to damage from solids which must be prevented from reaching the compressor. These materials, in spite of utmost care in assembling and cleaning out a system, seem to be always present and are frequently not dislodged until the system is initially started up. They are major contributors to hermetic motor burn-outs and are also the cause of mechanical damage to close-tolerance parts by abrasive action.

At the present time, a system sanitizing approach is used to isolate the motor compressor from three general categories of contaminants which play important roles in compressor failure. These are: (1) harmful soluble chemicals; (2) damaging liquids and solids; and (3) oxygen present in air as a non-condensable.

Liquid line filter-driers are used to remove a broad spectrum of soluble contaminants, which include water, acids, oil breakdown products, tars, resins, gums, and dirt of relatively large particle size. The resins and gums are adsorbed, and the dirt is filtered out. Such receiver driers are described in U.S. Pat. No. 3,118,288 and U.S. Pat. No. 3,785,164. They generally include a desiccant, such as a molecular sieve or alumina, and a flow directing means for forcing the liquid to pass through the desiccant.

A liquid line filter-drier for refrigeration systems is disclosed in U.S. Pat. No. 3,815,752 which combines an adsorbent bed and, downstream thereof, a pad of fiberglass within a conical or cylindrical wire form so that there is ample space within the enclosing shell for liquids to swirl around the fiberglass and enter it over a large area. However, the incoming liquid initially contacts a perforated plate containing the granular desiccant.

Another spring-loaded filter-drier for the liquid side of refrigeration systems is taught in U.S. Pat. No. 3,841,490. It comprises an adsorbent bed within a perforated canister and a plurality of fiberglass pads within a cylindrical spring. The canister and pads are spaced peripherally from the enclosing shell, to provide an annular flow channel, but abut shoulders of the shell at each end thereof. Flow therefore passes through the inlet corners of the canister, then through the annular flow channel, and finally through the filter media.

A bi-directional filter-drier for heat pump systems is additionally described in U.S. Pat. No. 4,125,469. This device comprises a cylindrical canister, which is peripherally spaced from the walls of the shell, and an outlet valve at each end, which is surrounded by an annular perforated screen which is closed against outward flow by a flap washer. Incoming flow moves through the flap valve, passes radially through the filter, and then moves axially through the hollow core of the filter to and through the outlet valve.

However, vapor-phase filters having very little pressure drop are being increasingly used in recent years. Such vapor-phase filters are designed to remove harmful particles that are too small for filter-driers to take out in the liquid line, in addition to materials which are present in the system beyond the point where the liquid line filter-drier is installed.

Used in conjunction with a liquid line filter-drier, a vapor-phase filter on the suction side of a system effectively isolates the motor compressor from finely divided steel and other metallic particles which are believed to be the major cause of motor burn-outs when carried to the windings by high-velocity suction gas. These offending particles include metal chips, solder flux, copper oxide, iron rust, carbon, corrosion solids, and the like which contribute to motor burn-out or cause compressor damage through abrasion. However, a suction-side filter will filter out gross quantities of the foreign materials as small as 5 microns (0.0002 inch) in diameter, with negligible pressure drop while permitting high rates of gas flow in the suction line. Such vapor-phase filters are necessarily large in volume as compared to liquid line filter-driers.

Compressor damage is also caused by slugging of refrigerant and oils which typically occurs when a refrigeration or air conditioning system has been idle for an extended period. The suction effect of the compressor, when starting up after such idleness, creates such a low pressure that both liquid and vapor are pulled out of the evaporator and reach the compressor unless a means is provided for separating the liquid from the vapor and accumulating the liquid until it can be gradually reintroduced into the system as needed in the form of harmless droplets mixed with the vapor.

Excessive quantities of liquid refrigerant dilute the oil, wash out bearings, and in some cases cause complete loss of oil in the crankcase of the compressor because of the high solubility of the oil in the refrigerant. Because compressors are designed to compress vapors, not liquids, such accumulations or "slugs" also can result in broken valve reeds, pistons, rods, crankshafts, and the like parts of a compressor.

Thus, a storage component in the form of an uprightly disposed cylinder is commonly added to the suction side of the refrigeration or air conditioning system to act as a reservoir for temporarily holding the excess oil-refrigerant mixture and returning it at a rate that the compressor can safely handle. Such an accumulator usually can hold from about one-half to about two-thirds of the oil-refrigerant mixture that is within the system.

However, in some refrigeration and air conditioning systems, accumulators are too small or are not installed even though needed. However, if a suction line filter-drier is added to the system, it will then be subject to the damaging effects of liquid slugs moving at a high velocity. Fiberglass, for example, can be literally torn and disrupted by such high velocity slugs. The surface of a fiberglass pad that receives the impact of fast-moving particles of metal and scale can also be rapidly plugged thereby. A need, therefore, exists to protect the relatively delicate fiberglass from impact of high-velocity particles and liquid slugs.

It is, therefore, desirable to interpose a filtering medium between the evaporator and the compressor that can, at least, disperse such liquid slugs into smaller droplets which will be harmless to the compressor while simultaneously providing filtering benefits with respect to particles and drying benefits with respect to moisture. Furthermore, it has been found that any filter, liquid line or suction line, tends to become plugged rather rapidly and abruptly as particles build up on its surface. The pressure drop across the filter-drier therefore tends to build up abruptly and to cause the air conditioning or refrigerating unit to go out of service with little or no warning. A means for providing a gradual build up that would furnish preliminary warnings to maintenance personnel is consequently desirable.

Designs of prior art filter-driers have generally sought to minimize inherent low efficiency with respect to pressure drop through the devices, because pressure drop in the suction line of a refrigeration or air conditioning system adversely affects the total system capacity and the cost of operation. In view of the limited space that is available adjacent to modern engines and refrigeration and air conditioning systems, both stationary and mobile, and the need for both filtering and drying, it is highly desirable to be able to combine the functions and the space requirements of a filter for very fine particles and the protective function of vapor state drying within the same device.

SUMMARY OF THE INVENTION

It is, therefore, an object of this invention to provide a device, for installation on the suction side of an air conditioning or refrigeration system, which is capable of filtering all fluids moving toward the compressor.

It is another object to provide within this device a means for minimizing the coating of filtering surfaces with small particles that can blind the filter.

It is additionally an object to provide a means for attenuating pressure drop caused by such coating of the filtering surfaces.

It is further an object to provide a means for drying the filtered vapor.

It is also an object to provide a means for protecting a filter within a filter/filter-drier from incoming high-velocity vapor, solid particles, and liquid slugs, and for disturbing such incoming materials into an upstream space providing access to both face and peripheral portions of a filter.

In accordance with the principles of this invention and those objects, a low-pressure, suction line fliter/filter-drier for use in air conditioning and refrigerating systems is herein provided that comprises in sealed combination within an enclosing shell assembly, comprising a cylindrical shell having an interior diameter, a pair of closure members which are sealably attached to the shell, and inlet and outlet connectors which are sealably attached to the closure members, the following components:

A. a desiccant, disposed as a cylindrical plug within the shell to provide an upstream space and a downstream space between the desiccant and the connectors;

B. a dual filter system, comprising: (1) a primary filter assembly which is disposed within the upstream space, comprising: (a) a center spacer post having a pair of ends, (b) an inlet deflector which is fastened to one of the ends, (c) a stepped filter having a maximum diameter which is substantially less than the interior shell diameter, (d) a perforated filter pad support which is fastened to the other end of the spacer post and has substantially the same diameter as the interior shell diameter and is disposed downstream of the inlet deflector, whereby the stepped filter is selectively compressed between the deflector and the filter pad support; and (2) a secondary filter assembly which is disposed within the downstream space and has substantially the same diameter as the interior shell diameter, comprising: (a) a perforated support cup, (b) a screen, and (c) an outlet filter pad which is disposed between the support cup and the screen;

C. an annular gasket, which is disposed adjacent to the filter pad support and on its downstream side, in peripheral contact with the interior diameter of the shell;

D. a spring which is coaxially disposed within the shell between the inlet closure member and the inlet deflector, thereby compressing the dual filter system and the desiccant between the closure members.

More specifically, the stepped filter comprises:

A. A deflector filter pad having a smaller size in plan view than the inlet deflector; and B. an inlet filter pad having a substantially larger area in plan view than the area of the deflector filter pad, a circular shape in plan view, and the maximum diameter of the filter element.

In addition, the deflector filter pad has a lesser thickness than the thickness of the inlet filter pad, most preferably approximately one-half the thickness of the inlet filter pad. It is also preferred that both the deflector and the deflector filter pad are triangular in shape.

The annular inlet gasket preferably comprises:

A. a highly compressed fiberglass filter pad which is disposed adjacent to the filter pad support and in surrounding relationship to the other end of the spacer post; and B. a perforated plate support which is disposed downstream of the inlet gasket and upstream of the desiccant.

The invention further comprises a method of designing a filter/filter-drier to provide increased contaminant holding capacity therewithin and to enable pressure drop across the filter/filter-drier to increase gradually and provide a warning of impending need for replacement thereof, wherein the filter/filter-drier comprises a cylindrical shell, a pair of sealably attached closure members at the ends thereof, inlet and outlet openings in the closure members, and a primary filter assembly. Specifically, this method comprises:

A. providing a stepped filter having a selected peripheral area, a selected facial area, and a selected internal volume which is accessible to a selected open upstream space that surrounds the filter and is in flow communication with the inlet opening; and B. providing, as another part of the filter assembly, a rigid deflector member which is disposed in coaxial alignment with the inlet opening, substantially downstream thereof, and transversely thereto for protecting the stepped filter pad; and C. providing a sealing means for isolating the open upstream space from the outlet opening except through a plurality of openings which are in flow communication with the stepped filter pad, whereby an incoming vaporous mixture enters the inlet opening, impinges upon the rigid deflector member, swirls through the upstream space, enters both the facial and peripheral areas of the stepped filter pad, moves along strata within the stepped filter, and deposits its solid particles at many locations therewithin before passing through the plurality of openings to the outlet opening.

The filter/filter-drier of this invention comprises a compact, dual filter system straddling a desiccant. It comprises a primary filter assembly on the upstream side of the desiccant and a secondary filter assembly on the downstream side thereof. The desiccant and the secondary filter assembly are considered to be a filter-drier in combination, and the primary filter assembly is considered to be essentially a large-capacity filter as well as a dispersal means for slugs of liquid. The desiccant is formed in the shape of a cylindrical plug.

The primary filter assembly comprises a stepped filter which is sized to provide clearance between it and the shell, thus allowing refrigerant to flow through an annular space surrounding the stepped filter and to enter through the periphery of the stepped filter and to flow in parallel to the layers of fibers while gradually filtering transversely thereto. This flow action allows contaminants to penetrate deeply into the stepped filter, thereby adding layers in depth to the filter area that is available in prior art filters and markedly increaing the filtration capacity of the stepped filter of the invention. Essentially, the entire volume of the stepped filter becomes available for capturing particles, instead of merely the pad surface in parallel to the fiberglass layers.

The primary filter assembly comprises an inlet deflector, a deflector filter pad and an inlet filter pad forming the stepped filter, a filter pad support, and a center spacer post which controls the amount of compression of the filter pads and holds the components together as a rigid unit. The inlet deflector and the filter pad support are secured to the spacer post with the two filter pads compressed between them.

The inlet deflector is a solid triangular metal part that prevents direct impingement upon the filter media by slugs or liquid and by solid particles. It deflects and reduces the velocity of the refrigerant, liquid slugs, and solid particles entering the vessel. The refrigerant is deflected into the annular space surrounding the stepped filter and affording access to the peripheries of the filter pads. The inlet gasket prevents bypassing of the filter element by the incoming refrigerant.

The deflector filter pad, which is adjacent to the inlet deflector, is preferably similarly triangular in shape and nests against bent side lugs of the inlet deflector. This pad provides additional surface area for filtration, this additional surface area being entirely peripheral area, and further provides added space, longitudinally, between the secondary filter and the inlet connector, thereby increasing the flow capacity of the unit. The equilateral triangular shape of this pad also allows it to be produced without scrap between the pads that is inherent in the manufacture of round pads.

Nevertheless, both the inlet deflector pad and the inlet deflector may be round or square. Preferably, the inlet deflector has side lugs, which partially but loosely enclose the deflector pad without restricting access of the swirling vapor to its sides, and pointed ends which may be bent as desired to provide snug centering within a fairly wide range of shell sizes.

The inlet filter pad is round and has a substantially smaller diameter than the inside diameter of the shell. This allows the refrigerant entering the upstream space to flow into an annular space surrounding the inlet filter pad and then to enter this pad through its peripherary as well as through a portion of its face. Because the face tends to block or catch solid particles of all sizes, it also tends to become blocked fairly readily and at a uniform time. In contrast,, the periphery tends to allow the vapor as well as the solid particles to pass in parallel to the fibers for a considerable distance and to lodge therein in an uneven manner while working gradually through the layers toward the downstream outlet. In consequence, contaminants are distributed throughout the entire interior of the inlet filter pad, and the pressure drop thereacross rises quite gradually.

The portion of the face that is covered by the inlet deflector pad receives inflowing material which has entered the periphery of the inlet deflector pad. It is consequently blocked much less readily and indeed functions as the interior of a one-piece stepped filter.

The entire inlet filter assembly is spring loaded against the inlet gasket and thereby spring loads the desiccant bed. Such spring loading is accomplished by a conical spring which is installed between the inlet filter element and the inlet end of the shell. This inlet gasket is preferably an annular ring of fiberglass which is compressed between the cup-shaped filter pad support and a perforated plate which is adjacent to the desiccant bed. However, other prior art inlet gaskets, such as rubber, asbestos, or nylon, can be utilized. Moreover, these prior art gaskets may be secured to the perforated metal support cup with an adhesive, so that the perforated plate may thereby be omitted from the assembly.

Downstream of the desiccant bed, the secondary filter assembly comprises an outlet filter pad which is housed in a perforated metal support cup that controls the amount of compression of the filter pad. This metal support cup rests against a screen and a perforated screen support.

Refrigerant flows only through the face of the outlet filter pad. Therefore, the outlet filter pad picks up smaller particles, including fragments of fiberglass and of desiccant, than the inlet filter system. It also captures particles which have worked their way through the primary filter assembly and the desiccant bed.

Although the filter/filter-drier of this invention is ideal for installation in the suction lines of refrigeration and air conditioning systems, immediately ahead of the compressors, it is also useful in the high-pressure liquid portions of such systems. Moreover, by utilizing the appropriate desiccants, this filter/filter-drier can additionally or alternatively be used in the high pressure vapor (hot gas discharge line) portions of such systems.

BRIEF DESCRIPTION OF THE DRAWINGS

The invention may be more fully understood by consideration of the following drawings in which a single embodiment of the invention is disclosed in FIGS. 1–5, 14, and 15, with alternative embodiments of the stepped filter being shown in FIGS. 6–13.

DESCRIPTION OF THE PREFERRED EMBODIMENT

Figure 1:
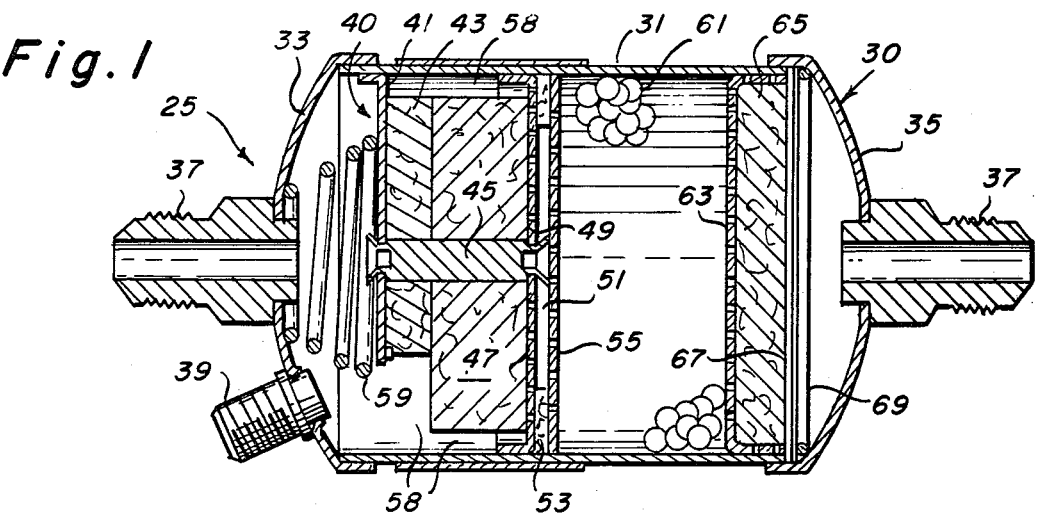
FIG. 1 is a longitudinal sectional view of the refrigerant filter and filter-drier of the invention.

The filter/filter-drier 25 of this invention, preferably operating on the low-pressure side of a refrigeration or air conditioning circuit, comprises a shell assembly 30, a rigid primary filter assembly 40, an inlet gasket 53, a desiccant bed 61, and a secondary filter assembly.

Shell assembly 30 comprises a cylinder 31, an inlet closure 33 which is welded to cylinder 31 at one end thereof, an outlet closure 35 which is welded to the other end of cylinder 31, a pair of connectors 37 which are sealably attached to inlet and outlet closures 33 and 35, and a valve 39 which is sealably attached to inlet closure 33. Connectors 37 and valve 39 furnish access to the interior of the shell formed by cylinder 31 and closures 33,35.

Rigid filter assembly 40, as seen particularly in FIGS. 2-5, comprises an inlet deflector 41, a deflector filter pad 43, a spacer post 45, an inlet filter pad 47, and a filter pad support 49.

Figure 2:
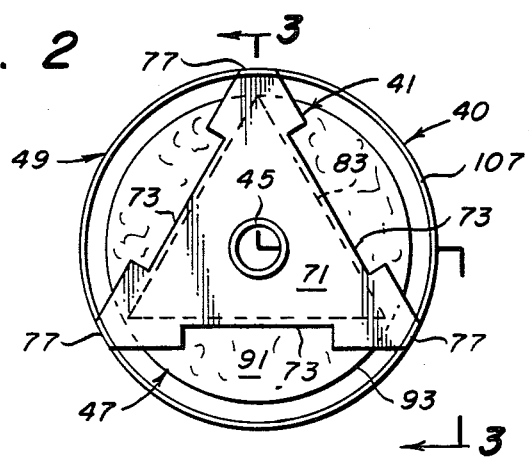
FIG. 2 is a top view of the rigid primary filter assembly of the invention that is disposed upstream of the desiccant bed within the shell assembly for the refrigerant filter/filter-drier.
Figure 3:
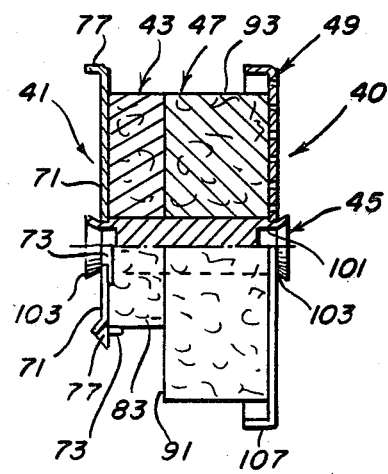
FIG. 3 is a sectional view, looking in the direction of the arrows 3—3 in FIG. 2, of the rigid primary filter assembly shown in FIG. 2.

Inlet deflector 41 is preferably triangular in shape and is also preferably somewhat larger than deflector filter pad 43, as seen most clearly in FIG. 2. Deflector 41 comprises a top surface 71, side lugs 73, a center hole 75, and corner lugs 77. Each corner lug 77 is of minimum size for its cylinder 31 and is formed simply by upwardly bending the unsupported corners of deflector 41 so that lugs 77 or, if necessary, the unbent points of these corners, touch the interior of cylinder 31, thereby bracing assembly 40 against sidewise movement. This means of emplacing assembly 40 enables it to fit snugly within a range of cylinder sizes, without requiring special devices for this purpose.

Deflector filter pad 43 comprises a top surface 81, side surfaces 83, and a center hole 85. Center hole 85 is larger in diameter than hole 75 of deflector 41. Side surfaces 83 are loosely restricted by side lugs 73 of deflector 41 so that triangular pad 43 is maintained in its initial position.

Figure 4:
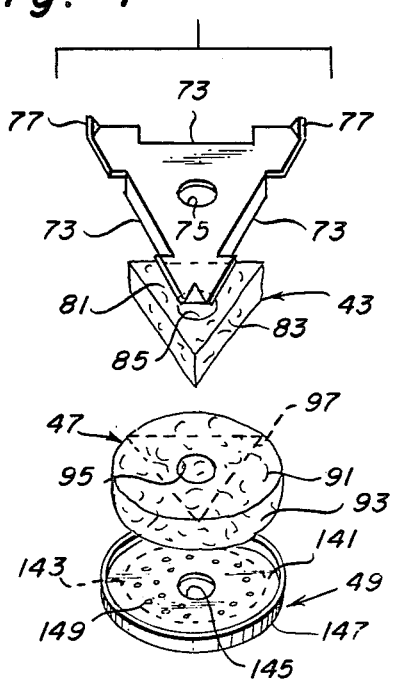
FIG. 4 is an exploded isometric view of the same rigid filter assembly of FIGS. 2 and 3.
Figure 5:
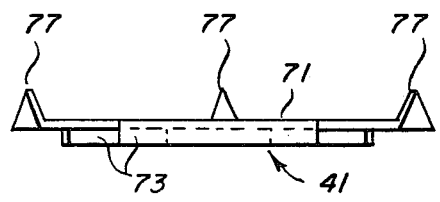
FIG. 5 is a side view of the inlet deflector which is clearly seen in FIGS. 2 and 4.

Inlet filter pad 47 comprises a top surface 91, a side surface 93, a center hole 89, and an edge 97 of contact by side surfaces 83, as seen in FIG. 4. Center hole 95 is of the same size as hole 85. The apexes of triangular pad 43 approximately touch the circumference of circular pad 47. In combination, pads 43,47 form a stepped filter pad providing many filtering advantages.

Filter pad support 49 comprises a center hole 145, a side 147, perforations 149, and edge 143 of contact by side surface 93. Center hole 145 is of the same diameter as hole 75 and permits entry by end surfaces 102 of spacer post 45.

Spacer post 45 comprises recesses 101 in each end, end surfaces 102 before flaring thereof, flared ends 103 after flaring thereof, end shoulders 104 which are adjacent to end surfaces 102, and a central surface 106 which is larger in diameter than end surfaces 102 and fits within holes 85,95. End surfaces 102 fit within holes 75,145. Spacer post 45 is of solid construction except for recesses 101.

Inlet gasket 53 is preferably a ½-inch thick annular pad of fiberglass which, when compressed between filter pad support 49 and perforated plate support 55, forms a sealing gasket which engages the inner surface of cylinder 31, preventing passage of any solid particles therebetween. Compressed pad 53 encloses an annular empty space 51, between filter pad support 49 and perforated plate support 55, that surrounds the downstream end of spacer post 45. As an alternative, pad 53 can be constructed of nylon, rubber, asbestos, or like material which is cemented to the downstream peripheral surface of filter pad support 49 so as to engage the inner surface of cylinder 31 without need for compression by perforated plate support 55, so that support 55 can be omitted from the assembly of this filter/filter-drier.

Desiccant bed 61 is preferably alumina but may comprise a molecular sieve, silica gel, Mobil Sorbead, or any other desiccant in ball or bead form.

The secondary filter assembly comprises support cup 63, outlet filter pad 65, screen 67, and screen support 69, as seen in FIG. 1. The dimensions of the sides of support cup 63, control the amount of compression of outlet filter pad 65 that is obtained.

The filter/filter-drier of this invention is assembled by inserting the secondary filter assembly into the bottom of a cup formed by outlet closure 35 and cylinder 31, adding desiccant 61 on top of support cup 63, placing perforated plate support 55 on top of desiccant 61, putting annular pad 53 upon plate support 55, and positioning rigid filter assembly 40 on top of pad 53. Lastly, spring 59 is placed on top surface 71 of inlet deflector 41, and inlet closure 33, fitted with its connector 37 and valve 39, is pressed down against spring 59 and held securely while welding its edges to cylinder 31.

The filtering function of rigid filter assembly 40 is heavily dependent on open space 58 that is available to the incoming vapors, liquid slugs, and solid particles entering inlet connector 37 and impinging upon surface 71. Although the periphery formed by surfaces 83, 93 can be extended by cutting them with a sinusoidal or jagged shape, for example, the benefit therefrom is less than the benefit of maintaining an adequate volume 58 in order to have maximum flow rate. If deflector pad 43 is much smaller than deflector 41, the additional volume that is available is not as useful as the filtering area that is given up thereby. Furthermore, problems with alignment of pad 43 and deflector 41 can develop because of such a disparity in size. If deflector 41 and pad 43 are larger than indicated in FIGS. 1-5, with very large lugs 77, open area 58 is significantly reduced and the flow rate is also reduced to a significant extent.

Other combinations of shapes and sizes for the stepped filter of the invention than that shown in FIGS. 1-5 are possible. FIGS. 6-13 show a wide variety of such possible combinations.

Figure 6:
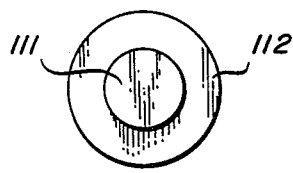
FIG. 6 is a top view of a deflector filter pad and an inlet filter pad, both of which are round.
Figure 7:
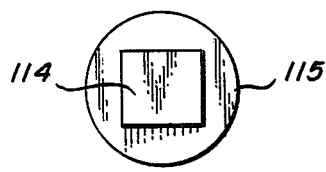
FIG. 7 is a top view of a square deflector filter pad and a round inlet filter pad.
Figure 8:
FIG. 8 is a top view of a small triangular deflector filter pad and a round inlet filter pad.

A round deflector filter pad 111 may be combined with a round inlet pad 112, as seen in FIG. 6; a square deflector pad 114 may be combined with a round inlet pad 115, as seen in FIG. 7; and a triangular deflector pad 117, of much smaller size than pad 43, may be combined with a round inlet pad 118 of normal size.

Figure 9:
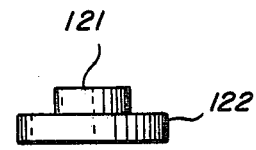
FIG. 9 is a side view of a deflector filter pad on top of an inlet filter pad, wherein each is of the same thickness.
Figure 10:
FIG. 10 is a side view of a deflector filter pad and an inlet filter pad, wherein the deflector filter pad is twice as thick as the inlet filter pad.
Figure 11:
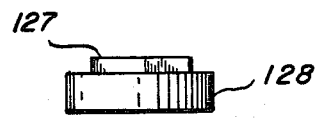
FIG. 11 is a side view of a deflector filter pad and an inlet filter pad, wherein the deflector filter pad is one-half as thick as the inlet filter pad.

The deflector filter pad and the inlet filter pad may also vary considerably in thickness, as seen in FIGS. 9-11. Deflector pad 121 has the same thickness as inlet pad 122 (FIG. 9); deflector pad 124 has greater thickness than inlet pad 125 (FIG. 10); and inlet pad 127 has less thickness than inlet pad 128 (FIG. 11). The relationship shown in FIG. 11 is preferred.

Figure 12:
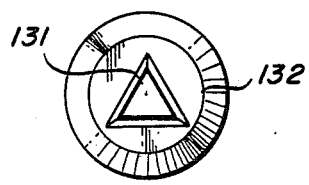
FIG. 12 is a top view of a triangular deflector filter pad and a round inlet filter pad, wherein both are truncated in shape.
Figure 13:
FIG. 13 is a side view of the truncated pads seen in FIG. 12.
Figure 14:
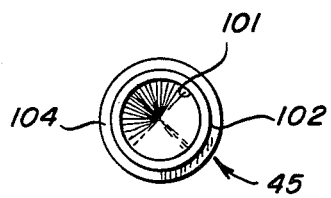
FIG. 14 is an end view of the center spacer post which is a part of the rigid filter assembly of FIGS. 2-4, before assembly thereof.
Figure 15:
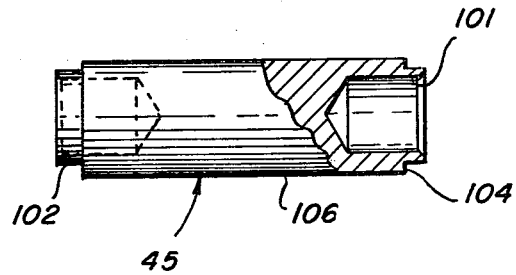
FIG. 15 is a side view of the same spacer post, one end of which is broken away.

In addition, the sides of the deflector filter pad and the inlet filter pad need not be perpendicular to their faces. As seen in FIGS. 12 and 13, for example, pads 131, 132 may be truncated in shape, whereby the flow paths from various elevations along their peripheries to perforations 149 are more nearly uniform while still providing an annular space for travel of the inflowing vaporous mixture.

Among the important capabilities of this filter/filter-drier, because it provides peripheral areas for entrance of vapors to be filtered, are the following: (1) the flow rate is greater and the pressure drop is less; (2) the vapors tend to move along the strata of the fiberglass and the solid particles which are to be filtered out tend to be caught at many locations instead of along a single surface zone as in prior art filters (a used deflector pad 43 and inlet pad 47 appear to be completely saturated with particles all over their interiors in addition to a thin surface zone along surface area 91 outside of lines 97 of pad 47); and (3) the pressure drop across assembly 40, as filter pads 43, 47 begin to fill up, rises gradually instead of sharply, as in prior art filters where the transversely disposed surface of a fiberglass pad or the cylindrical surface of a ceramic filter catches all of the filtered particles.

Such a gradual buildup of pressure is very important when there has been a compressor failure, resulting in a burned out compressor and installation of a new compressor with hi-side and lo-side driers installed. As is well known in the art, after such an occurrence, it is practically impossible to remove all dirt and other solid particles from the system so that they have to be taken out by the filters. By having a filter/filter-drier of this invention on the low-pressure side of the system, it is feasible to watch the pressure gauge as the particles are filtered out and the pressure drop builds up and to replace the filter/filter-drier at a convenient time rather than being faced with a sudden pressure drop that renders the whole unit inoperative at an inopportune time.

Because it will be readily apparent to those skilled in the refrigeration art that innumerable variations, modifications, applications, and extensions of the principles hereinbefore set forth can be made without departing from the principles and the scope of this invention, what is hereby defined as such scope and is desired to be protected should be measured and the invention should be limited, only by the following claims.

What is claimed is:

1. A filter/filter-drier for use in air conditioning and refrigerating systems, comprising:
   A. a shell assembly, comprising a cylindrical shell having an interior diameter, a pair of closure members which are sealably attached to opposite ends of said shell, an inlet connector which is sealably attached to one said closure member, and an outlet connector which is sealably attached to the other said closure member;
   B. a desiccant, formed in the shape of a cylindrical plug, which is disposed within said shell to provide an upstream space and a downstream space between said desiccant and said connectors;
   C. a dual filter system, comprising:
      (1) a primary filter assembly which is coaxially disposed within said upstream space, comprising:
         (a) a center spacer post having a pair of ends,
         (b) an inlet deflector which is fastened to one said end,
         (c) a stepped filter having a maximum diameter which is substantially less than said interior shell diameter, and
         (d) a perforated filter pad support which is fastened to said other end of said spacer post and has substantially the same diameter as said interior shell diameter, said stepped filter being disposed between said inlet deflector and said perforated filter pad support and in surrounding relationship to said center spacer post, whereby said stepped filter is selectively compressed between said deflector and said filter pad support;
      (2) a secondary filter assembly which is disposed in said downstream space and has substantially the same diameter as said interior shell diameter;
   D. an annular inlet gasket which is disposed adjacent to said filter pad support and is in peripheral contact with said cylindrical shell, for sealably separating said upstream space from said downstream space; and
   E. a spring which is coaxially disposed within said shell and in pressurized contact with one said closure member and which thereby compresses said dual filter system, said gasket, and said desiccant between said closure members.

2. The filter/filter-drier of claim 1, wherein said secondary filter assembly comprises:
   A. a perforated support cup,
   B. a screen, and
   C. an outlet filter pad which is disposed between said support cup and said screen.

3. The filter/filter-drier of claim 1, wherein said stepped filter comprises:
   A. a deflector filter pad having a smaller size in plan view than said maximum diameter; and
   B. an inlet filter pad having a circular shape in plan view and said maximum diameter.

4. The filter/filter-drier of claim 3, wherein said deflector filter pad has a substantially smaller area in plan view than the area of said inlet pad.

5. The filter/filter-drier of claim 4, wherein said deflector filter pad has a lessor thickness than the thickness of said inlet pad.

6. The filter/filter-drier of claim 5, wherein said deflector filter pad has approximately one-half the thickness of said inlet pad.

7. The filter/filter-drier of claim 3, 4, 5, or 6, wherein said deflector and said deflector pad are triangular in said shape.

8. The filter/filter-drier of claim 3, 4, 5, or 6, wherein said deflector and said deflector filter pad are circular in said shape.

9. The filter/filter-drier of claim 3, 4, 5, or 6, wherein said deflector and said deflector filter pad are square in said shape.

10. The filter/filter-drier of claim 3, 4, 5, or 6, wherein said deflector filter pad is truncated.

11. The filter/filter-drier of claim 10, wherein said inlet pad is truncated.

12. The filter/filter-drier of claim 11, wherein said annular inlet gasket is elastomeric and is adhesively attached to the downstream side of said filter pad support, adjacent to said desiccant.

13. The filter/filter-drier of claim 1, wherein said inlet gasket comprises an annular fiberglass pad and said drier further comprising a perforated plate support which is disposed between said inlet gasket and said desiccant, so that said fiberglass pad is compressed to provide said inlet gasket.

14. A method of glass constructing a filter/filter-drier to provide increased contaminant holding capacity therewithin and to enable pressure drop across said filter/filter-drier to increase gradually and provide a warning of impending need for replacement thereof, wherein said filter/filter-drier comprises a cylindrical shell, a pair of sealably attached closure members at the ends thereof, coaxially disposed inlet and outlet openings in said closure members, and a primary filter assembly, said method comprising:
A. providing, as a part of said filter assembly, a stepped filter having a selected peripheral area, a selected facial area, and a selected internal volume which is accessible to a selected open upstream space that surrounds said stepped filter and is in flow communication with the inlet opening; and
B. providing, as another part of said filter assembly, a rigid deflector member which is disposed in coaxial alignment with said inlet opening, substantially downstream thereof, and transversely thereto for protecting said stepped filter; and
C. providing a sealing means for isolating said open upstream space from said outlet opening except through a plurality of openings which are in flow communication with said stepped filter, whereby an incoming refrigerant mixture enters said inlet openings, impinges upon said liquid deflector member, swirls through said upstream space, enters both said facial and said peripheral areas of said stepped filter, moves along strata within said stepped filter, and deposits its solid particles at many locations within said internal volume before passing through said plurality of openings to said outlet opening.

15. The method of claim 14, wherein said stepped filter comprises a triangularly shaped deflector pad and a circularly shaped inlet pad held in face-abutting relationship, said deflector filter pad being adjacent to and protected by said rigid deflector member from impingement of said refrigerant mixture.

16. A filtering device for refrigeration and air conditioning systems which comprises a cylindrical shell, a pair of closure members which are sealably attached to the ends of said shell, and an inlet connector sealably attached to one of said closure members, and an outlet connector sealably attached to the other said closure member, said filtering device comprising:
A. a filter assembly which comprises:
1. an inlet deflector which is disposed transversely to said shell,
2. a stepped filter which comprises:
(a) a deflector filter pad, of selected shape and size, which is disposed adjacent to and downstream of said inlet deflector,
(b) an inlet filter paid which:
(1) is disposed adjacent to and downstream of said deflector filter pad,
(2) is round in shape, and
(3) has a smaller diameter than the inside diameter of said shell, said deflector filter pad differing in said shape and said size from said round shape and being of a smaller diameter than the diameter of said inlet filter pad to provide a stepped annular space which has a greater cross-sectional area in its upstream portion surrounding said deflector filter pad than in its downstream portion surrounding said inlet filter pad,
(c) a filter pad support, disposed transversely to said shell and adjacent to and downstream of said inlet filter pad, and having a plurality of openings therethrough, all of which are covered by said inlet filter pad, and a diameter approximately equal to said inside diameter of said shell, and
3. means for rigidly supporting said inlet deflector, said stepped filter, and said filter pad support of said filter assembly; and
B. an annular gasket which is disposed adjacent to said filter pad support and in peripheral contact with said cylindrical shell to provide sealed isolation of said stepped annular space, whereby a swirling flow of an incoming vaporous mixture, entering said inlet connector, impinging upon said inlet deflector, and swirling through said stepped annular space, is forced to enter the peripheries of said stepped filter and then to flow along strata therewithin, while depositing its solid particles at many locations along the interiors of said deflector filter pad and said inlet filter pad, before passing through said plurality of openings so that pressure build up across said filtering device is gradual and provides a warning of impending need for replacement of said device.

17. The filtering device of claim 16, wherein said deflector pad is an equilateral triangle in said shape and is approximately one half the thickness of said inlet filter pad in said size.

* * * * *

UNITED STATES PATENT OFFICE
CERTIFICATE OF CORRECTION

Patent No. 4,364,756      Dated December 21, 1982

Inventor(s)   John P. Clarke and Ernest W. Schumacher

It is certified that error appears in the above-identified patent and that said Letters Patent are hereby corrected as shown below:

Column 3, line 55, "disturbing" should be --distributing--.

Column 4, line 22, between "annular" and "gasket", insert --inlet--.

Column 4, line 59, after "providing", insert --as a part of the filter assembly--.

Column 5, line 31, change "increaing" to --increasing--.

Column 8, line 8, delete "center hole 89" and insert --center hole 95--. Column 11, line 31, delete "glass".

Signed and Sealed this

Twelfth Day of February 1985

[SEAL]

Attest:

DONALD J. QUIGG

Attesting Officer     Acting Commissioner of Patents and Trademarks